(12) United States Patent
Ebert

(10) Patent No.: US 7,814,751 B2
(45) Date of Patent: Oct. 19, 2010

(54) MOTOR VEHICLE BRAKING SYSTEM WITH SPRING ADJUSTED BRAKE PEDAL FEEL

(75) Inventor: Stephen D. Ebert, Milford, MI (US)

(73) Assignee: G M Global Technology Operations, Inc., Detroit, MI (US)

( * ) Notice: Subject to any disclaimer, the term of this patent is extended or adjusted under 35 U.S.C. 154(b) by 408 days.

(21) Appl. No.: 11/935,485

(22) Filed: Nov. 6, 2007

(65) Prior Publication Data

US 2009/0113890 A1    May 7, 2009

(51) Int. Cl.
    *F15B 13/14*      (2006.01)
    *B60T 11/10*      (2006.01)

(52) U.S. Cl. .......................................... 60/562; 91/369.1

(58) Field of Classification Search .................... 60/554, 60/562; 91/369.1
See application file for complete search history.

(56) References Cited

U.S. PATENT DOCUMENTS

2005/0115236 A1*   6/2005   Kusano ........................ 60/533
2006/0220451 A1*   10/2006   Drumm .................... 303/114.1

OTHER PUBLICATIONS

"Objective Characterization of Vehicle Break Feel" by D.G. Ebert and R.A. Kaatz, Society of Automotive Engineers Technical Paper 940331, International Congress, Detroit, MI, Feb. 28-Mar. 3, 1994.
"Wave Springs" product sheet of Smally Steel Ring Company of Lake Zurich, IL 60047, 2 pages, dated Aug. 24, 2006.

* cited by examiner

*Primary Examiner*—Thomas E Lazo

(57) ABSTRACT

A compliance spring is disposed between the brake pedal and the primary piston of a master cylinder, preferably between the push rod and the primary piston of the master cylinder. Selection of the initial spring compression load of the compliance spring, its permitted spring compression travel and its spring constant, allow for both a simplified and fine adjustment of the brake pedal feel per a brake feel index.

8 Claims, 3 Drawing Sheets

MOTOR VEHICLE BRAKING SYSTEM WITH SPRING ADJUSTED BRAKE PEDAL FEEL

TECHNICAL FIELD

The present invention relates to braking systems of motor vehicles. More particularly, the present invention relates to a braking system in which the master cylinder is provided with a compliance spring disposed between the primary piston and the push rod thereof which serves to provide a predetermined brake pedal feel for the driver.

BACKGROUND OF THE INVENTION

The braking system of a "two-mode" hybrid motor vehicle, which vehicle synergistically includes an internal combustion engine and an electrical propulsion system, is accomplished, typically, through two different braking modes: powertrain regenerative braking and standard friction braking. Powertrain regenerative braking is a technology which provides vehicular slowing by converting kinetic energy of the vehicle's movement into electromagnetic energy which is returned to a battery of the electrical propulsion system. Standard friction braking is a technology which provides vehicular slowing by converting the vehicle's kinetic energy into heat by means of friction.

In each of these braking modes, the driver applies force to the brake pedal which is transmitted from the brake pedal pad through a pedal lever arm to a pushrod which delivers the driver applied force as an input to a primary piston of the master cylinder. The motion of the primary piston by the driver's applied force is opposed biasably by a return spring, which is preselected with an initial spring compression load and a particular spring constant which collectively ensure that the primary piston returns to its initial seated position after every brake application by the driver (while seals may provide a small resistance, the initial spring compression load of the return spring is the main determiner of the pedal preload needed for the driver to initiate brake pedal travel).

The vehicular deceleration is a function of brake pedal travel and brake pedal force as determined by software calibration. The brake pedal force feedback to the driver over and above the return spring initial spring compression load is created by the master cylinder pressurizing a pedal "simulator" which consists of a piston and cylinder arrangement, where the piston compresses a spring. The master cylinder starts developing fluid pressure when a lip seal covers the by-pass ports in the primary piston. The onset of braking can be chosen through the calibration to occur just as the fluid pressure starts to build in the master cylinder. The simulator allows for a desired linear increase of force and travel as the vehicle increases its deceleration. The end result is a brake pedal force versus brake pedal travel curve, as for example shown at FIG. 5, plot 304 of graph 300 that starts at the pedal preload target "E", then linearly increases to a "knee" point "F" just prior to the onset target, then continues to "G" through the target for deceleration at a value of 0.5 g above onset.

In general, (i.e., hybrid and non-hybrid vehicles) the master cylinder converts the physically applied brake pedal force by the driver into hydraulic pressure which operates other devices of the braking system. In a basic hydraulic braking system, the master cylinder creates a pressure output to the friction brakes after a small amount of travel. This travel is between the lip seal and the compensating fluid port to the fluid reservoir. Due to a need for power assist on most passenger vehicles, a brake pedal gain device is utilized, typically either in the form of a vacuum servo booster or a hydroboost unit located between the pedal and the master cylinder. This provides an opportunity to tune the initial force and travel characteristics of the pedal by modifying the internal components of the vacuum booster or the hydroboost.

The foregoing is exemplified by FIGS. 1A through 1C, which depict a prior art master cylinder used in a hybrid vehicle, and which is merely by way of exemplification a GMT900H master cylinder of General Motors Corporation of Detroit, Mich.

The master cylinder 10 receives a force input by the driver from the brake pedal 6 via a pedal lever arm 8 (see FIG. 1C), wherein the force is transmitted to a push rod 12 of the master cylinder. A terminal end 12a of the push rod 12 inserts into a cavity 14a formed in a primary piston 14 and axially abuts the primary piston, typically as a ball and socket arrangement. A terminal end portion 14b of the primary piston 14 passes through a fluid seal 16 and abuts an intermediate piston 18. The intermediate piston 18 is biased toward its initial seated position (the primary and the intermediate pistons being shown at their respective initial seated positions in FIGS. 1A and 1B) by a return spring 20, wherein the biasing is in opposition to brake pedal force supplied by the driver via the push rod 12. The return spring 20 has a predetermined initial spring compression load and a predetermined spring constant so that the primary piston returns to its initial seated position after every brake pedal application by the driver. The master cylinder further includes secondary pistons 22.

In the case of a two-mode hybrid vehicle, the normal operation of the master cylinder generates the working pressure to the friction brakes, which is produced by a hydraulic pump/accumulator setup in response to electrical signals from the brake pedal force and brake pedal travel, so that no brake pedal gain device is needed between the pushrod and the master cylinder. In the case of other hybrids, i.e., larger hybrid SUVs, the pedal feel is modified by the action of a zero-adjust brake switch located at the pedal arm to the pushrod interface which is there to provide a brake switch input. This switch input provides an electrical signal to the secondary braking circuit. Non-hybrid trucks, for exemplar comparison, also use this zero-adjust brake switch for the switch function, and any modification of the pedal feel due to the switch is secondary as the switch is only tuned for switch function, and not specifically tuned for pedal feel.

Historically, engineering of the human interface with a braking system has been a subjective endeavor. With the advent of a Brake Feel Index, hereinafter referred to as "BFI", as reported in SAE technical paper 940331 "Objective Characterization of Vehicle Brake Feel" by D. G. Ebert and R. A. Kaatz of General Motors Corporation, dated Feb. 28-Mar. 3, 1994, which paper is hereby incorporated herein by reference, a method was developed to correlate objective engineering parameters to these subjective assessments of brake pedal feel as perceived by the driver. In the case of BFI, such aspects as brake pedal application force, brake pedal travel and brake pedal preload are compared to desired target values which correlate to a particular type of response desired and the deviation from these target values is reflected in a lower index value. In the conventional master cylinder, including that shown at FIGS. 1A and 1B, changing these parameters requires extensive reconstruction and retooling thereof.

An existing engineering issue relating to the master cylinder is the return spring initial spring compression load and the primary piston travel before fluid pressure generation, also known as "cut-off" travel, which produce a brake pedal preload and force versus travel relationship that has to be adjusted so as to avoid an undesirable brake pedal feel. The return spring compression load required to ensure that the primary piston will return to its initial seated position per pressure buildup in the master cylinder results in too little force increase during primary piston travel before the "knee" point of the pedal travel versus pedal force curve (see "F" in plot 304 of graph 300 of FIG. 5). The BFI targets are not easily met within hardware constraints, since to meet these targets would require expensive reconstruction and testing of the master cylinder, return spring, and other related hardware of the braking system.

Accordingly, what remains needed in the art is some way to adjust parameters which effect BFI without requiring a complete and comprehensive reconfiguration of the master cylinder, for multiple applications and brake pedal feel requirements of different motor vehicle platforms.

SUMMARY OF THE INVENTION

The present invention is a motor vehicle braking system with spring adjusted brake pedal feel provided by modification of an otherwise conventional braking system master cylinder to include a compliance spring which allows for simplified adjustment of the parameters which make up the BFI without requiring a complete and comprehensive reconfiguration of the master cylinder, being applicable to multiple applications and brake feel requirements of different motor vehicle platforms.

According to the present invention, a compliance spring is disposed between the brake pedal and the primary piston of the master cylinder, wherein the selection of the initial spring compression load of the compliance spring, its permitted spring compression travel and its spring constant, allow for both a simplified and fine adjustment of the brake pedal feel per the BFI. Accordingly, the compliance spring serves to modify the brake pedal preload, which can now be determined based upon the initial spring compression load of the compliance spring, wherein the operation of the compliance spring is selected to match the brake pedal feel target based upon the BFI.

By way of example in a two-mode hybrid vehicle as discussed hereinabove, the brake pedal force feedback to the driver over and above the return spring initial spring compression load is created by the master cylinder pressurizing fluid when the lip seal covers the by-pass ports in the primary piston. The onset of braking can be chosen through calibration of the piston and cylinder arrangement, as for example to occur just as the pressure starts to build in the master cylinder. Now, according to the present invention, by choosing the compression travel of the compliance spring, its spring constant and its initial spring compression load, the brake pedal force and the travel between the pedal preload point and the onset point can be specified to match the pedal feel target per the BFI.

It will be understood that the compliance spring may be used in any suitable master cylinder (i.e., of the braking system of a hybrid or non-hybrid vehicle) to achieve a simplified adjustment of the brake pedal feel.

Accordingly, it is an object of the present invention to provide a means by which adjustment of the operational characteristics of master cylinders can be made in order to meet more favorably rated BFI values.

This and additional objects, features and advantages of the present invention will become clearer from the following specification of a preferred embodiment.

DESCRIPTION OF THE PREFERRED EMBODIMENT

Figure 1:
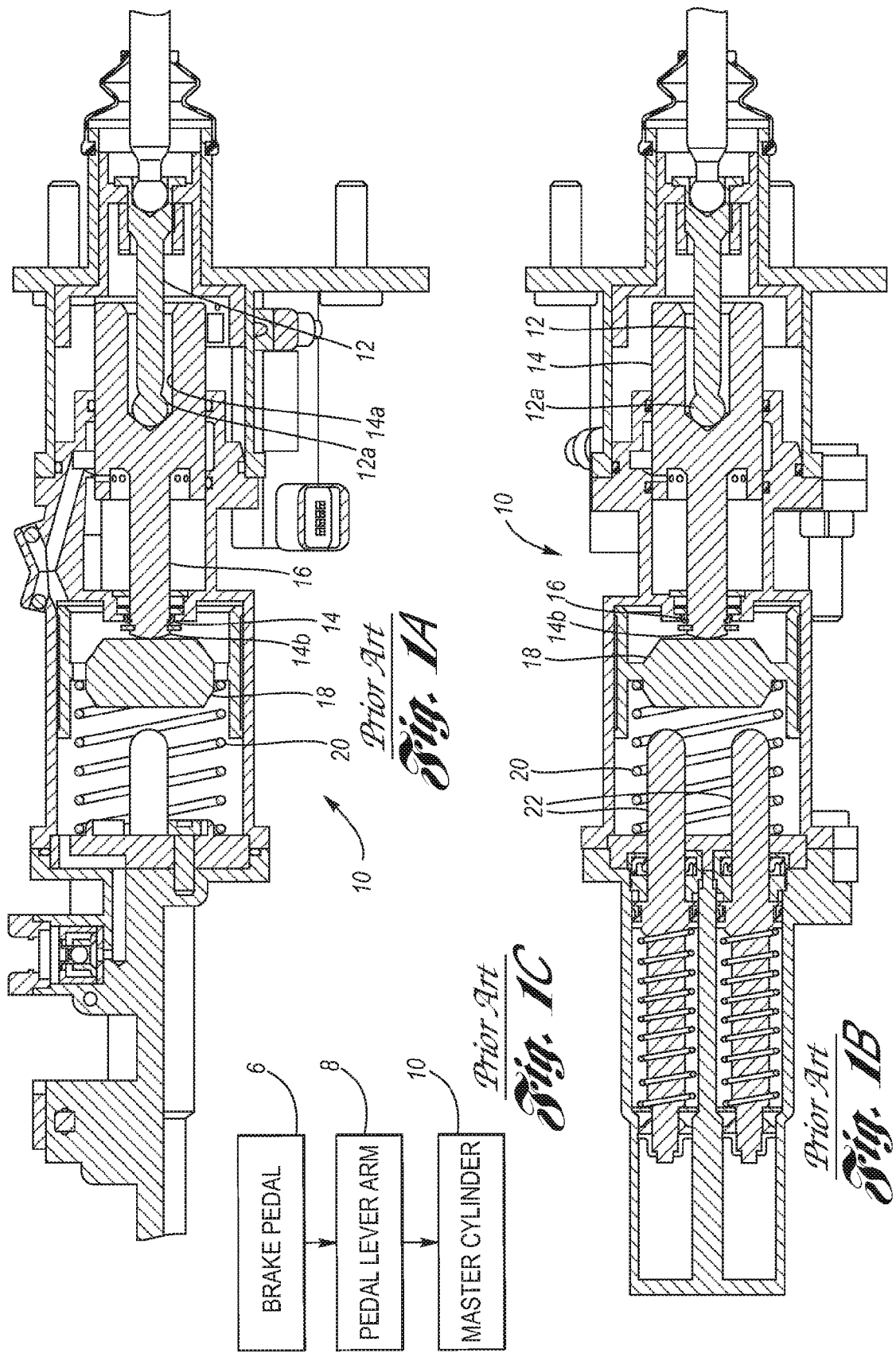
FIGS. 1A and 1B are cross-sectional views, oriented normal with respect to each other, of a prior art master cylinder for a two-mode hybrid vehicle.
FIG. 1C is a diagram of the mechanical linkage between a brake pedal and a master cylinder.
Figure 2:
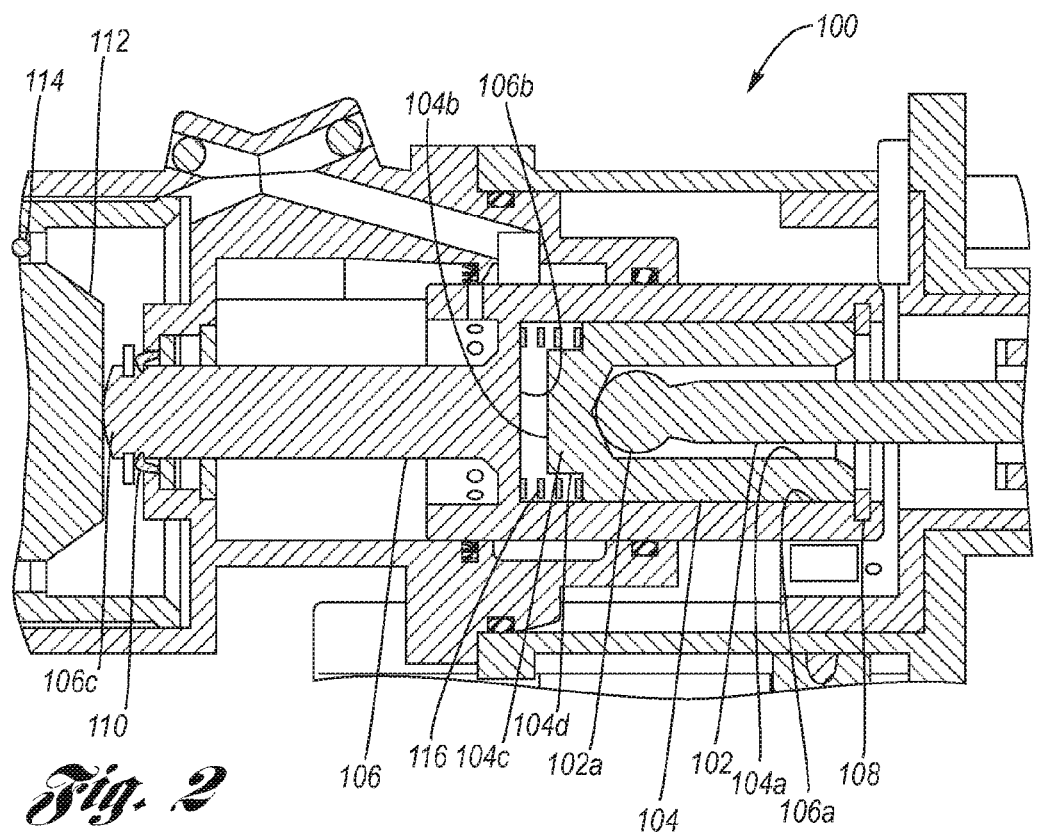
FIG. 2 is a broken-away sectional view of a master cylinder as in FIG. 1A, now modified according to the present invention, to include a compliance spring, wherein the master cylinder is shown with the compliance spring at its initial spring compression load.
Figure 3:
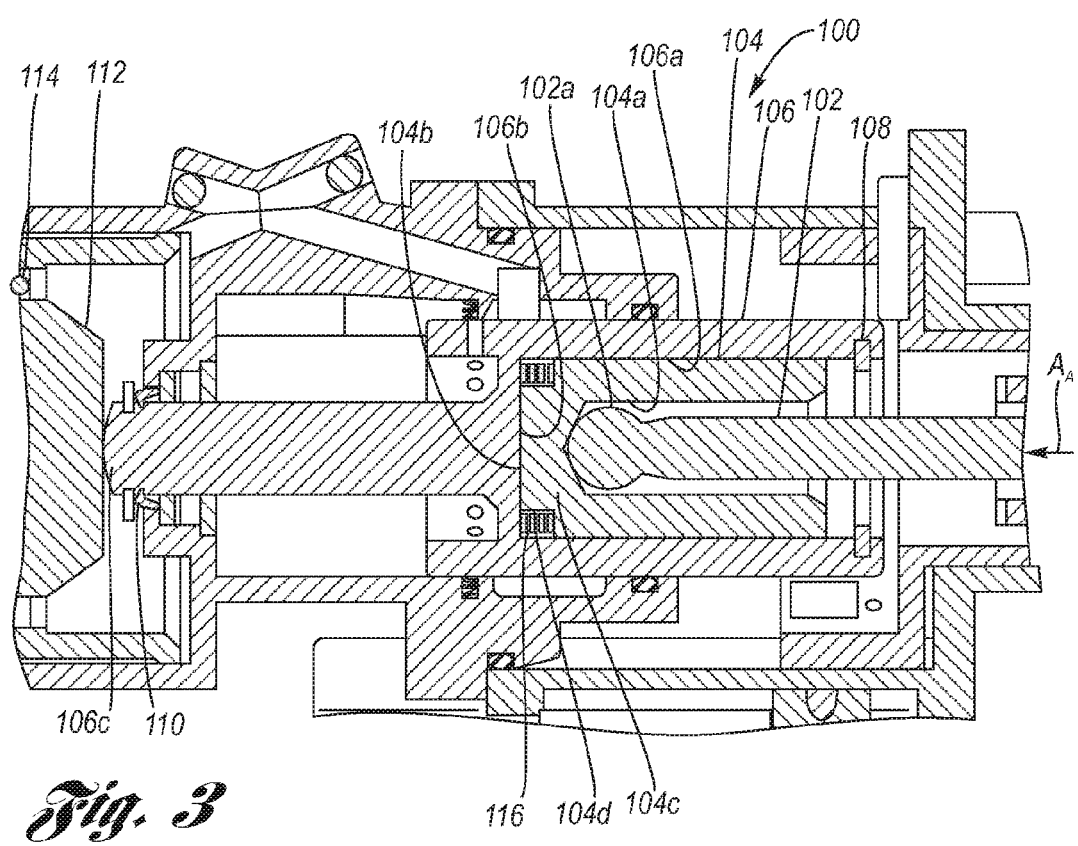
FIG. 3 is a broken-away sectional view as in FIG. 2, wherein now the master cylinder is shown with the compliance spring now at its maximal spring compression load.

Referring now to the Drawing, FIGS. 2 and 3 depict an example of a motor vehicle braking system master cylinder modified to include a spring adjusted brake pedal feel according to the present invention, wherein the modified master cylinder 100 is shown broken away and the portion thereof not shown is, merely by way of example, generally identical that shown in FIGS. 1A and 1C. The following description of the preferred embodiment is merely exemplary in nature and is not intended to limit the invention, its applications, or its uses, as the present invention is applicable to any suitable master cylinder.

A push rod 102 receives a brake pedal force input from a pedal lever arm (not shown, but see for example FIG. 1C), wherein a terminal end 102*a* of the push rod inserts into a sliding piston cavity 104*a* formed in a sliding piston 104 and axially abuts the sliding piston, preferably as a ball and socket arrangement. The sliding piston 104, in turn, is received in a primary piston cavity 106*a* of a primary piston 106, wherein the distal end 104*b* of the sliding piston is abuttable with an end wall 106*b* formed in the primary piston at the blind end of the primary piston cavity.

The sliding piston 104 is slidable within the primary piston cavity 106*a*, the sliding travel being limited in one direction of travel by abutment of the distal end 104*b* with the end wall 106*b* and in the other direction of travel by abutment with a retainer ring 108 which is affixed to the primary piston 106. A terminal end portion 106*c* of the primary piston 106 passes through a fluid seal 110 and abuts an intermediate piston 112. The intermediate piston 112 is biased toward its initial seated position (the primary and the intermediate pistons being shown at their respective initial seated positions in FIG. 2) by a return spring 114 (more fully seen, by way of example, at 20 of FIG. 1A), wherein the biasing is in opposition to brake pedal force supplied by the driver via the push rod 102.

A distal end portion 104*c* of the sliding piston 104 has a reduced diameter portion 104*d*, whereat is generally seated a compliance spring 116, shown at its predetermined initial spring compression load, the load acting between a land 104e (which defines the reduced diameter portion) and the end wall 106b of the primary piston 106. The compliance spring 116 is selected to provide a particular spring biasing via its selected spring constant, its selected initial spring compression load and its selected compression travel which travel is defined by the travel of the sliding piston, as described above.

While any biasing agency may be used to bias the sliding piston (or more generally the push rod, or yet more generally the brake pedal) with respect to the primary piston, a preferred compliance spring 116 is of the wave spring type. Wave springs are preferred over, for example, coil springs because wave springs are significantly smaller height for fitting into small axial volumes, yet provide an equivalent spring compression load (i.e., spring force). An example of a suitable wave spring is available through Smalley Steel Ring Company of Lake Zurich Ill. 60047, for example part number CS075-M3. Since wave springs are available in a large variety of spring constants, they are selectively suitable to meet the BFI for specific master cylinders of different vehicle platforms, and more particularly to better match particular return spring characteristics.

While FIG. 2 depicts the modified master cylinder 100 whereat the compliance spring is at its initial spring compression load and the distal end 104b of the sliding piston 104 is located in its permitted travel farthest from the end wall 106b of the primary piston 106, FIG. 3 depicts the modified master cylinder at a point in brake pedal application in which the driver has applied brake pedal force sufficient to cause the distal end of the sliding piston to abut the end wall of the primary piston and the compliance spring 116 has compressed to its preselected maximal spring compression load before the onset of fluid pressure build up in the master cylinder. In this regard, the push rod 102 has moved along arrow AA in the direction of the driver applied brake pedal force. At the point this occurs, it is preferred for the compliance spring maximal spring compression load (occurring at abutment between the distal end 104b and the end wall 106b) to match the initial spring compression load of the return spring 114. Thereafter, as additional brake pedal force is applied by the driver, the movement of the primary piston results as the return spring compressing.

Figure 4:
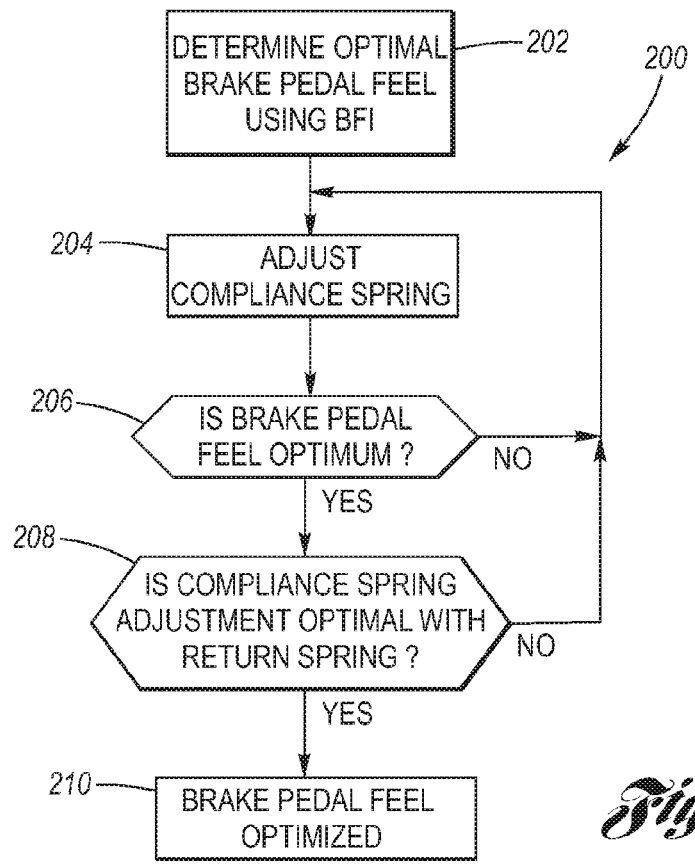
FIG. 4 is an exemplar flow chart of a method for optimizing brake pedal feel according to the present invention.

FIG. 4 is a flow chart 200 of an exemplar method for optimizing brake pedal feel according to the present invention.

At Block 202 a determination of an optimal brake pedal feel is determined. This determination is preferably based upon the BFI as identified and described in the above referenced SAE technical paper 940331. Next, at Block 204 a compliance spring is selected, preferably a wave spring, wherein its spring constant, spring compression travel and initial spring compression load are taken into account. At Decision Block 206, inquiry is made as to whether the brake pedal feel is, in fact, the optimum desired from Block 202 with the compliance spring installed. This may be done by physical experiment or by other empirical analysis, wherein the compliance spring is adjusted to achieve the desired optimization at Block 204. At Decision Block 208, inquiry is further made (if desired) as to the suitability of the adjusted compliance spring with respect to the return spring in terms of providing a brake pedal feel which involves a smooth transition therebetween. For example, the maximal spring compression load of the compliance spring may be adjusted to be equal to the initial spring compression load of the return spring. The optimization may further take into account the hydraulic functionality of the master cylinder in relation to the compressional characteristics of the return spring (as discussed hereinabove), wherein the compliance spring is adjusted to achieve the desired optimization at Block 204. The end result of this process is an optimized brake pedal feel at Block 210.

Figure 5:
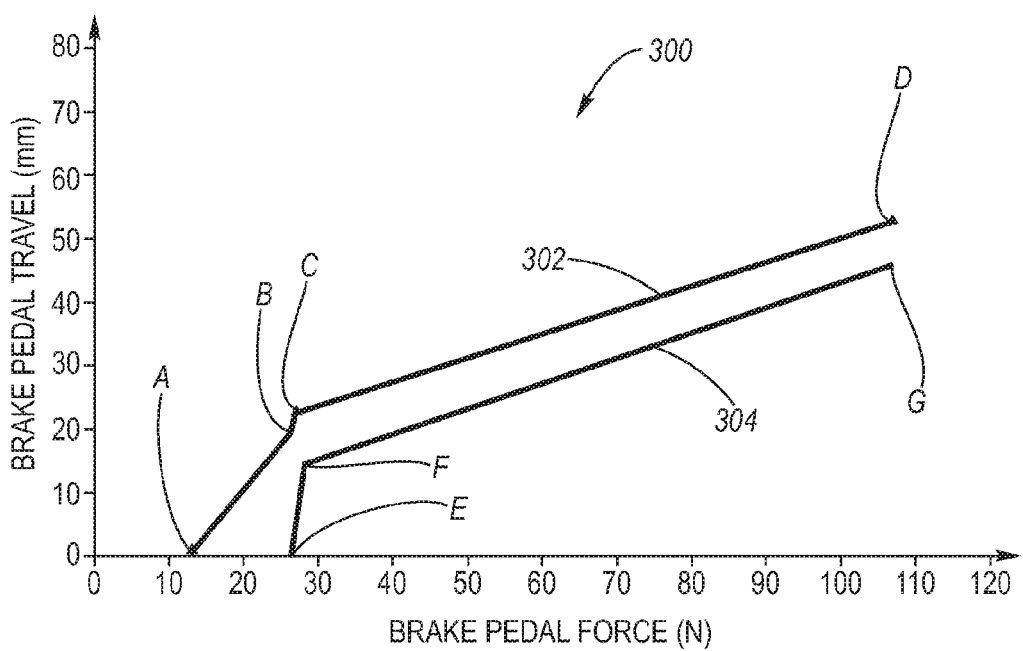
FIG. 5 is a graph displaying plots of the performance of a modified master cylinder according to the present invention and of the performance of a prior art master cylinder, both plots being in terms of brake pedal travel versus brake pedal force.

FIG. 5 depicts a graph 300 of brake pedal force versus brake pedal travel, illustrating the modified master cylinder brake pedal characteristics of the present invention as represented by FIGS. 2 and 3, as compared with that of a prior art master cylinder as represented by FIGS. 1A and 1B.

Plot 302 illustrates the brake pedal characteristics of the modified master cylinder 100 according to the present invention. Point A indicates the brake pedal preload force required to initiate compression of the compliance spring 116 (see FIG. 2) above its initial spring compression load. At point B, the compliance spring has reached its intended maximal spring compression load which is equal to the initial spring compression load of the return spring (see FIG. 3). At this point, the sliding piston has abutted the primary piston and any additional applied pedal force causes compression of the return spring. Point C is the "knee" point where the fluid pressure begins to build in the brake master cylinder, which pressure linearly continues to point D.

Plot 304 illustrates the brake pedal characteristics of the prior art master cylinder of FIGS. 1A and 1B. Point E reflects the brake pedal preload force required to initiate compression of the return spring with respect to its initial spring compression load. Point F is the "knee" point where the fluid pressure begins to build in the brake master cylinder, which pressure continues linearly to point G.

By comparing the two plots 302 and 304, the importance of the present invention is evident. The difference in pedal force as between point A and point E demonstrates that the master cylinder modified according to present invention requires a much lower brake pedal preload force as compared to the prior art master cylinder. The compliance spring has a higher spring constant and lower initial spring compression load than that of the return spring, which is reflected in the slope between points A and B of plot 302 being less steep than the slope between points E and F of plot 304. This difference in slope is indicative of an adjusted brake pedal feel which is tailorable to fit a BFI to provide an optimal brake pedal feel feedback to the driver.

The plot 302 from point B to point C has the same slope as the plot 304 from point E to point F since they both involve compressing the return spring prior to building of hydraulic pressure within the master cylinder. The slope of the plot 302 between points C and D is the same as the slope of the plot 304 between points F and G because in both plots hydraulic pressure is building. The vertical shift between the plots 302 and 304 reflects the associated brake pedal travel associated with compression of the compliance spring and corresponding reduction of the cut-off travel.

The inclusion of the sliding piston and compliance spring package according to the present invention allows for simplified adjustment of the brake pedal preload force, the brake pedal force and, to a lesser extent, the brake pedal travel. Further, the brake pedal preload felt by the driver when the brake pedal is applied is now determined by a tunable biasing agency (i.e. the compliance spring) instead of by the return spring. Also, the increase in brake pedal force between brake pedal preload and the force to initiate movement of the primary piston can be determined by spring constant choice of the compliance spring so that at the end of the spring compression travel thereof, the spring compression load of the compliance spring matches the initial spring compression load of the return spring, and thereby provides a smooth spring compression travel transition by avoiding a steep change in brake pedal force versus brake pedal travel.

The brake pedal force versus brake pedal travel involves a linear slope after brake pedal preload with a "knee" point and slope change at the point the master cylinder generates fluid pressure. This features allows the master cylinder to be fine tuned with respect to initial pedal feel characteristics so as to match demonstrated pedal feel targets in the BFI. Also, the ease of tuning for different brake pedal feels by simple modification of the configuration of reduced diameter portion of the sliding piston and/or spring constant choice of the compliance spring and/or spring compression travel of the compliance spring allows for brake pedal feel change without the usual retooling involvement and timing constraints. During development, brake pedal feel can be tuned by physically testing different spring constants and spring compression travels, using for example shims, without changing the remaining master cylinder hardware.

The benefit of the present invention is the ability to tune the brake pedal preload independently of the return spring initial spring compression load, thus maximizing its primary piston return performance without compromising brake pedal feel. The master cylinder and the pedal simulator, if present, can be designed to produce a linear fluid pressure increase with respect to brake pedal travel. Now, the brake pedal travel between initiation of brake pedal motion and the initiation of primary piston motion can be adjusted to meet precise brake pedal feel optimization per the BFI.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A master cylinder for a braking system, comprising:
   a master cylinder primary piston having a primary piston cavity formed therein, wherein said primary piston cavity has an end wall;
   a sliding piston slidably received in said primary piston cavity;
   a biasing agency biasing said sliding piston away from said end wall;
   an abutment connected to said primary piston for abuttably engaging said sliding piston so as to thereby define a limitation of travel of said sliding piston away from said end wall; wherein said limitation of travel defines a travel distance of said sliding piston with respect to said end wall of said primary piston;
   an intermediate piston abutting said primary piston; and
   a return spring biasing said intermediate piston toward said primary piston;
   wherein when said sliding piston abuts said end wall, said biasing agency is at a predetermined maximal compression spring load;
   wherein said return spring has a predetermined first spring compression load and a first predetermined spring constant, and wherein said biasing agency has a predetermined second spring compression load and second predetermined spring constant; and
   wherein said predetermined first spring constant and said predetermined first spring compression load are preselected in relation to said predetermined second spring constant, said predetermined second spring compression load and said predetermined maximal spring compression load such that an increasing axial force applied to said sliding piston in a direction toward said end wall results in said sliding piston sliding into abutment with said end wall when the axial force is substantially equal to said first spring compression load.

2. The master cylinder of claim 1, further comprising:
   said biasing agency comprising a compliance spring;
   said sliding piston having formed therein a sliding piston cavity; and
   a push rod received in said sliding piston cavity, said push rod axially abutting said sliding piston.

3. The master cylinder of claim 2, wherein said compliance spring is a wave spring.

4. In a master cylinder for a braking system, the master cylinder comprising a primary piston having a primary piston cavity formed therein, an intermediate piston in abutment with respect to the primary piston, a push rod received in the primary piston cavity and in axial abutment with the primary piston, and a return spring biasing the intermediate piston toward the primary piston; an improvement thereto comprising:
   a biasing agency disposed between the push rod and the primary piston; said primary piston cavity having an end wall; said biasing agency biasing said sliding piston away from said end wall;
   a sliding piston slidably received in said primary piston cavity; and
   an abutment connected to said primary piston for abuttably engaging said sliding piston so as to thereby define a limitation of travel of said sliding piston away from said end wall; wherein said limitation of travel defines a travel distance of said sliding piston with respect to said end wall of said primary piston; wherein:
   when said sliding piston abuts said end wall, said biasing agency is at a predetermined maximal compression load;
   the return spring has a predetermined first spring compression load and a first predetermined spring constant, and wherein said biasing agency has a predetermined second spring compression load and second predetermined spring constant; and
   said predetermined first spring constant and said predetermined first spring compression load are preselected in relation to said predetermined second spring constant, said predetermined second spring compression load and said predetermined maximal compression load such that an increasing axial force applied to the push rod in a direction toward said end wall results in said sliding piston sliding into abutment with said end wall when the axial force is substantially equal to said first spring compression load.

5. The improved master cylinder of claim 4, further comprising:
   said biasing agency comprising a compliance spring;
   said sliding piston having formed therein a sliding piston cavity; and
   the push rod being received in said sliding piston cavity, the push rod axially abutting said sliding piston.

6. The improved master cylinder of claim 5, wherein said compliance spring is a wave spring.

7. A method for adjusting brake pedal feel with respect to a master cylinder of a braking system, comprising the steps of:
   determining an optimal brake pedal feel responsive to a brake feel index;
   disposing a biasing agency between a brake pedal and a primary piston of the master cylinder; wherein the biasing agency is preselected to provide said optimal brake pedal feel;

disposing a compliance spring between a push rod of the master cylinder and the primary piston;

adjusting the compliance spring by at least one of adjusting a spring compression travel of the compliance spring, adjusting an initial spring compression load of the compliance spring, and adjusting a spring constant of the compliance spring to thereby provide said optimal brake pedal feel; and adjusting the compliance spring so that the compliance spring has a maximal spring compression load which is substantially equal to an initial spring compression load of a return spring of the master cylinder.

8. The method of claim 7, further comprising:

adjusting the compliance spring so that the combination of the compliance spring, an hydraulics of the master cylinder and a return spring of the master cylinder collectively provide said optimized brake pedal feel.

* * * * *